Inventor
Albert E. Henderson
By
Attorney

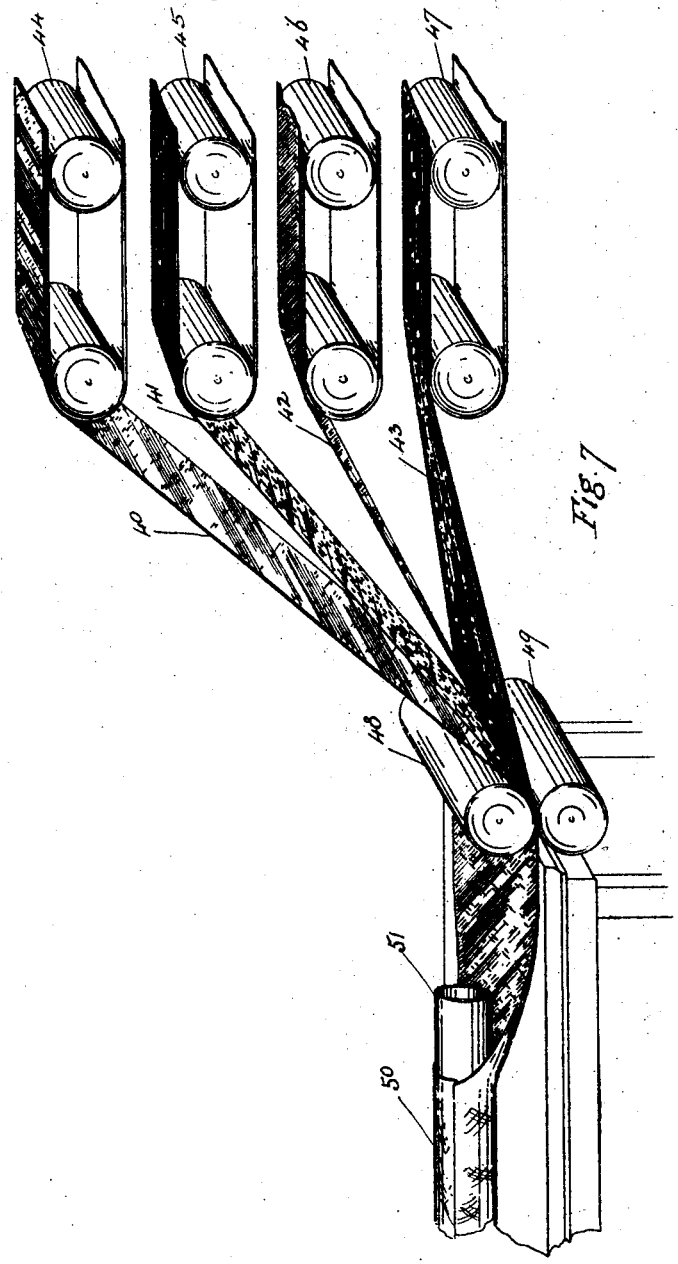

Patented Sept. 11, 1928.

1,683,669

UNITED STATES PATENT OFFICE.

ALBERT ENNIS HENDERSON, OF TORONTO, ONTARIO, CANADA.

METHOD OF MANUFACTURING TIRE TUBES.

Application filed September 30, 1921. Serial No. 504,403.

The object of the invention is to provide a method of producing a superior tire tube as to strength, durability, economy of material, resistance to pinching and puncture and minimization of leakage, under such conditions as to utilize the maximum natural elasticity of the component rubber as it is at present commercially prepared in calendered sheet form, and in full recognition of the fact that such tubes are at present produced for the trade by transversely rolling a calendered sheet to form a series of two or more laminæ in which the "grain" of the rubber or the line of calendering movement of the sheet is parallel with the length of the tube.

In the accompanying drawings, to which reference is made hereinafter as a means of elucidating the method and illustrating certain of the steps thereof—

Figure 7 represents a diagrammatic view of a modified form of apparatus for assembling the parts which go to make up a tube.

Figure 3:
Figure 3 shows a series of strips placed end to end.

In carrying out the invention, an ordinary calendered sheet 10 of the raw rubber is slitted or cut on lines transverse to the sheet or to the line of progress of the sheet as it leaves the calender rolls, said transverse lines being either perpendicular to the side edges or the line of progress of the sheet as at 11 or oblique to said side edges or line of progress as at 12 to form relatively short strips 13, which are then placed end to end to form a series as shown in Figure 3. The end edges of the strips are formed by the side edges of the sheet, so that the lines of the "grain" extend transversely of the strips. The end edges of the strips may be slightly overlapped and pressed lightly to cause surface adherence.

Figure 4:
Figure 4 shows a double series of strips—those of one series being inverted with reference to those of the other, as shown by the "grain" marks thereon.

When the strips are cut on oblique lines, the "grain" extends transversely thereof on oblique lines and this type of strip is especially adapted for use in the form of insert shown in Figure 4, wherein a plurality of series 14 and 15 each consisting of strips arranged end to end are arranged in superposed and preferably coextensive relation and by inverting the strips of one series 15 or turning them upside down with reference to the other series 14, the "grain" of the strips in one series lies in planes intersecting or crossing the planes of the "grain" in the strips of the other series. Obviously the number of series is subject to multiplication but preferably adjacent series are arranged with the grain of their strips in intersecting relation. As to whether this intersection is at a right angle or an acute or an obtuse angle with reference to the length of the series, will depend upon the angle of the oblique lines upon which the calendered sheet 10 is cut to form the strips and may be varied to modify the relative longitudinal and transverse resistances or degrees of elasticity to suit the purposes for which the tube is designed and the special strains to which it may be subjected in that connection.

Figure 5:
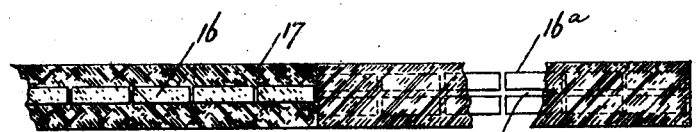
Figure 5 shows an insert composed of two series of relatively inverted strips and fabric reenforcing elements adherently placed thereon in overlapping staggered relation, portions of the layers being broken away to progressively show the several parts.

The fabric reenforcing elements 16 consisting of canvas or its equivalent may now be applied to complete the insert, and while there is latitude for variation in this respect, according to the ultimate purpose of the tube, it is preferable to arrange the same upon the opposite or exposed side surface of the series of strips, and as shown in Figure 5, to dispose them in longitudinal and transverse spaced relation on each surface, so as to leave intermediate wholly unrestricted zones of rubber and to relatively arrange the elements at the opposite surfaces of the strip in overlapping staggered relation, so that the intervals 17 between the elements 16 on one side, cross or intersect the intervals 18 between the elements 16ª on the other side, to the end that a hole for a valve stem may be punched through the insert in such zones of the intersection or registration without passing through a fabric element, although the hole thus formed will be bounded or reenforced on all sides that both longitudinally and transversely by the adjacent edges of said elements.

Figure 6:
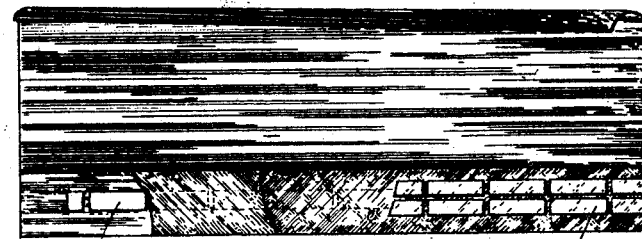
Figure 6 shows the arrangement of the insert on the second sheet of calendered rubber and the direction of rolling the latter to form the tube preliminary to vulcanizing.

A slight pressure will cause such surface adherence of the fabric elements to the series of strips as to facilitate handling and positioning the completed insert on the second calendered sheet 19, as shown in Figure 6, in longitudinal relation thereto, or parallel with its side edges. The strips comprising the series which compose the insert are cut of a width proportionate or bearing a definite proportion to the circumference of the ultimate tube, as, for example, of such a width as to extend exactly once around the tube as the sheet 19 is rolled transversely as indicated in Figure 6 to incorporate the insert, which is thus covered on each by at least one thickness of the material of the sheet 19.

When the tube has been rolled it is ready for vulcanization, or for bending to join the ends if a tire tube is to be constructed, as a step preceding vulcanization.

Figure 1:
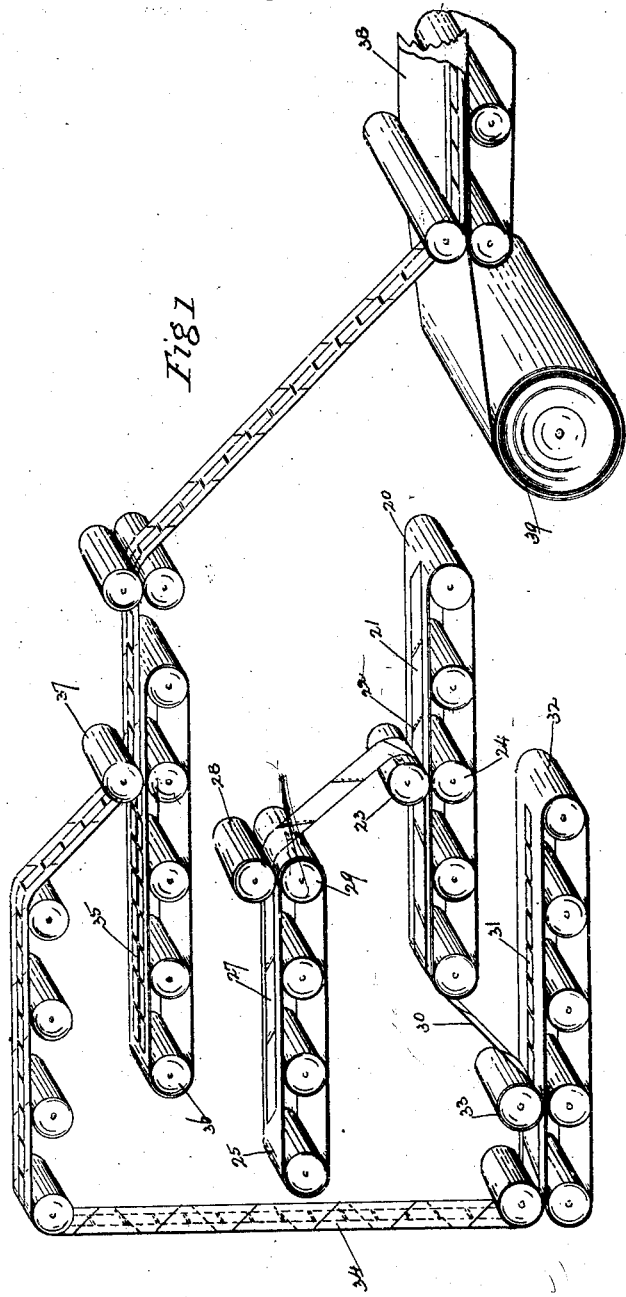
Figure 1 is a diagrammatic view of an apparatus for assembling and arranging the material parts of a tube preparatory to the rolling of the same.
Figure 2:
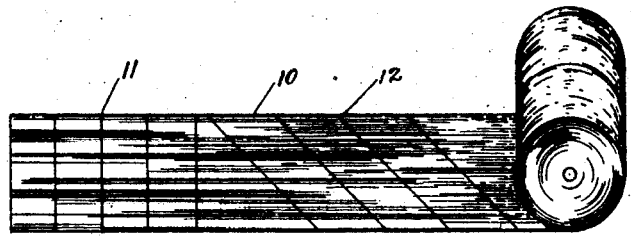
Figure 2 is a view of a sheet of calendered rubber having the longitudinal "grain" indicated thereon and showing the transverse (perpendicular and oblique) lines of separation of the strips formed therefrom.

In the diagrammatic view of Figure 1 there is shown an endless belt 20 forming a table upon which the obliquely cut strips 21 may be arranged in an end to end series with their oblique end edges slightly overlapped as at 22 to receive a gentle fixing pressure of the cooperating rolls 23 and 24, sufficient merely to cause an adherence to guard against displacement as the series progresses through the succeeding steps of the process. At 25 is a second table of the endless belt type upon which the strips 27 are similarly arranged and terminally "fixed" at their end edges which are identical with the strips 21, is now inverted as shown and brought into superposed coextensive relation with the first series, the joints between the strips 27 falling between the joints in the first series, so as to "break", and the composite strip or insert 30 thus formed is brought into surface contact at one side with fabric reinforcing elements 31 arranged on an endless table 32, where, by passing under a roll 33 adherence is assured. Thence the continuous insert, as at 34, with the fabric elements adhering to one side surface thereof is inverted to bring its opposite side surface into contact with another series of fabric elements 35 arranged on the endless table 36 and passing under the "fixing" roll 37 the completed insert is then conveyed to and fed longitudinally upon the continuous calendered sheet 38 supplied, for example, by the stock roll 39. The subsequent cutting of the sheet to the proper lengths, the transverse rolling of these length into tubular form to incorporate the inserts and the final vulcanizing of the tube will be understood from the foregoing description.

In Figure 7 I have shown the series of sheets of rubber; 40, 41, 42, and 43, some of which are built up previously of layers having the grain varying in relation to the other layers and are brought together and caused to adhere by passing between the rollers 48, being conveyed to the same by means of carriers 44, 45, 46 and 47, thus bringing together in a sheet 50 which is approximately the required width to encircle the pole 51 and properly splice longitudinally or the said sheet 50 may be formed up by the usual mechanical means, so as to form a tube which may be readily placed upon the usual pole, and vulcanized in the usual way.

In this diagrammatic view it will be noted that the fabric strips have not been applied to the rubber sheets and may be thus omitted if desired except for valve base or bases which may be embedded as desired.

Having described the invention, I claim:

1. The method of producing a laminated rubber tube which consists in cutting a calendered rubber sheet on transverse lines to form strips of a width bearing a definite proportion to the circumference of the ultimate tube, placing said strips in series in end to end relation, parallel with the length of a second calendered sheet, rolling said second sheet transversely to incorporate said series of strips and finally vulcanizing.

2. The method of producing a laminated rubber tube which consists in cutting the calendered rubber sheet on parallel transverse lines to form strips of a width proportionate to the circumference of the ultimate tube, joining said strips in end to end relation to form a series, placing said series parallel with the length of a second calendered sheet, rolling said second sheet transversely to incorporate said series of strips and finally vulcanizing.

3. The method of producing a laminated tube, which consists in cutting a calendered rubber sheet on parallel transverse lines to form strips of a width bearing a definite proportion to the circumference of the ultimate tube, placing said strips in end to end relation, with their end edges slightly overlapping, to form a series, applying pressure to the overlapping edges of said strips to cause adherence thereof, placing the series of joined strips parallel with the length of a second calendered sheet, rolling said second sheet transversely to incorporate said series of strips as a lamination thereof, and finally vulcanizing.

4. The method of producing a laminated rubber tube, which consists in cutting a calendered rubber sheet on parallel lines oblique to the length of the sheet to form strips of a width bearing a definite proportion to the circumference of the ultimate tube, placing said strips in end to end relation to form a plurality of superposed series, the strips in one series being inverted with reference to those in another series, arranging said superposed series parallel with the length of another calendered sheet, rolling said second sheet transversely to incorporate said series of strips and finally vulcanizing.

5. The method of producing a laminated rubber tube, which consists in cutting a calendered rubber sheet on parallel lines oblique to the length of the sheet to form strips of a width proportionate to the circumference of the ultimate tube, placing said strips end to end to form a plurality of superposed substantially coextensive series, the strips in one series being inverted with reference to those in another series, arranging said superposed coextensive series parallel with the length of another calendered sheet, rolling said second sheet transversely to incorporate said series of strips and finally vulcanizing.

6. The method of producing a laminated rubber tube, which consists in cutting a calendered rubber sheet on parallel lines oblique to the length of the sheet to form strips of a width proportionate to the circumference of the ultimate tube, placing said strips in end to end relation to form a plurality of superposed series, the strips in one series being inverted with reference to those in another series, and the joints between the strips of one series being disposed between the joints of the other series, arranging said superposed series parallel with the length of another calendered sheet, rolling said second sheet transversely to incorporate said series of strips, and finally vulcanizing.

7. The method of producing a laminated rubber tube, which consists in cutting a calendered rubber sheet on parallel lines oblique to the length of a sheet to form strips of a width proportionate to the circumference of the ultimate tube, arranging the strips in end to end series relation, with their proximate edges overlapping, applying pressure to the overlapping edges sufficient to cause adherence, placing the series of joined strips thus formed upon and parallel with the length of a second calendered sheet, rolling the said second sheet transversely to incorporate the series of strips, and finally vulcanizing.

8. The method of producing a laminated rubber tube, which consists in cutting a calendered rubber sheet on parallel lines oblique to the length of a sheet to form strips of a width proportionate to the circumference of the ultimate tube, arranging the strips in end to end series relation with their proximate edges overlapping, disposing a plurality of said series of strips in superposed relation, the strips in one series being inverted with reference to those in another series, placing the said plurality of series of superposed strips thus formed upon and parallel with the length of a second calendered sheet, rolling said second sheet transversely to incorporate said series of strips, and finally vulcanizing.

9. The method of producing a laminated rubber tube which consists in cutting a calendered rubber sheet on transverse lines to form strips of a width proportionate to the circumference of the ultimate tube, placing said strips in end to end relation to form a series, placing fabric reenforcing elements on the surface of said series of strips to form a reenforced insert, placing the insert upon the surface of and longitudinally as to a second calendered rubber sheet, rolling the said second sheet transversely to incorporate the insert and finally vulcanizing.

10. The method of producing a laminated rubber tube, which consists in cutting a calendered rubber sheet on transverse lines to form strips of a width proportionate to the circumference of the ultimate tube, placing said strips in series in end to end relation, placing fabric reenforcing elements upon the opposite surfaces of said series of strips to form a reenforced insert, pressing the insert to cause adherence of said elements to the strips, placing the insert upon the surface of and longitudinally as to a second calendered rubber sheet, rolling the said second sheet transversely to incorporate the insert and finally vulcanizing.

11. The method of producing a laminated rubber tube, which consists in cutting a calendered rubber sheet on transverse diagonal lines to form strips of a width proportionate to the circumference of the ultimate tube, placing said strips in superposed series with the strips in end to end relation, the strips of one series being inverted with relation to those of another series, placing fabric reenforcing elements upon the surface of said series of strips to form a reenforced insert, placing the insert upon the surface of and longitudinally as to a second calendered rubber sheet, rolling the second sheet transversely to incorporate the insert, and finally vulcanizing.

12. The method of producing a laminated rubber tube, which consists in cutting a calendered rubber sheet on transverse diagonal lines to form strips of a width proportionate to the circumference of the ultimate tube, placing said strips in superposed series in end to end relation, the strips of one series being inverted with reference to those of another, placing fabric reenforcing elements upon the opposite exposed surfaces of the series of strips, placing the insert upon the surface of and longitudinally as to a second calendered rubber sheet, rolling the said second sheet transversely to incorporate the insert, and finally vulcanizing.

13. The method of producing a laminated rubber tube, which consists in cutting a calendered rubber sheet on transverse diagonal lines to form strips of a width proportionate to the circumference of the ultimate tube, placing said strips in superposed series, the strips being in end to end relation and the strips of one series being inverted with reference to those of another, placing fabric reenforcing elements upon the opposite exposed surfaces of the series of strips to form a reenforced insert, the elements on one side being arranged in overlapping staggered relation with those on the other side, placing the insert upon the surface of and longitudinally as to a second calendered rubber sheet, rolling the second sheet transversely to incorporate the insert, and finally vulcanizing.

In witness whereof I have hereunto set my hand at Washington, District of Columbia, this thirtieth day of September, A. D. nineteen hundred and twenty-one.

ALBERT ENNIS HENDERSON.